(12) United States Patent
Nechushtan et al.

(10) Patent No.: US 8,254,286 B2
(45) Date of Patent: Aug. 28, 2012

(54) METHOD AND SYSTEM FOR DETECTION OF NAT DEVICES IN A NETWORK

(75) Inventors: Oren Nechushtan, Tel Aviv (IL); Gil Friedrich, Tel Aviv (IL); Oded Comay, Tel Aviv (IL)

(73) Assignee: Forescout Technologies Inc., Cupertino, CA (US)

( * ) Notice: Subject to any disclaimer, the term of this patent is extended or adjusted under 35 U.S.C. 154(b) by 0 days.

(21) Appl. No.: 12/162,807

(22) PCT Filed: May 24, 2007

(86) PCT No.: PCT/IL2007/000625
§ 371 (c)(1),
(2), (4) Date: Jul. 31, 2008

(87) PCT Pub. No.: WO2008/012792
PCT Pub. Date: Jan. 31, 2008

(65) Prior Publication Data
US 2009/0175197 A1    Jul. 9, 2009

(51) Int. Cl.
*H04L 12/28*    (2006.01)
(52) U.S. Cl. .......................................... 370/254; 726/23
(58) Field of Classification Search .................. 370/389, 370/338, 254; 726/23
See application file for complete search history.

(56) References Cited

U.S. PATENT DOCUMENTS

| | | | |
|---|---|---|---|
| 7,440,434 B2* | 10/2008 | Chaskar et al. .............. | 370/338 |
| 2004/0249911 A1* | 12/2004 | Alkhatib et al. .............. | 709/223 |
| 2006/0029063 A1* | 2/2006 | Rao et al. ...................... | 370/389 |
| 2006/0187912 A1* | 8/2006 | Schwartz et al. ............. | 370/389 |

* cited by examiner

*Primary Examiner* — Robert Wilson
*Assistant Examiner* — Wei Zhao
(74) *Attorney, Agent, or Firm* — Vladimir Sherman; Professional Patent Solutions

(57) ABSTRACT

Disclosed is a device, system and method for detecting a Network Address Translation ("NAT") gateway on a network. According to some embodiments of the present invention a detector including a network communication module may transmit one or more interrogation packets to a suspected NAT gateway.

19 Claims, 6 Drawing Sheets

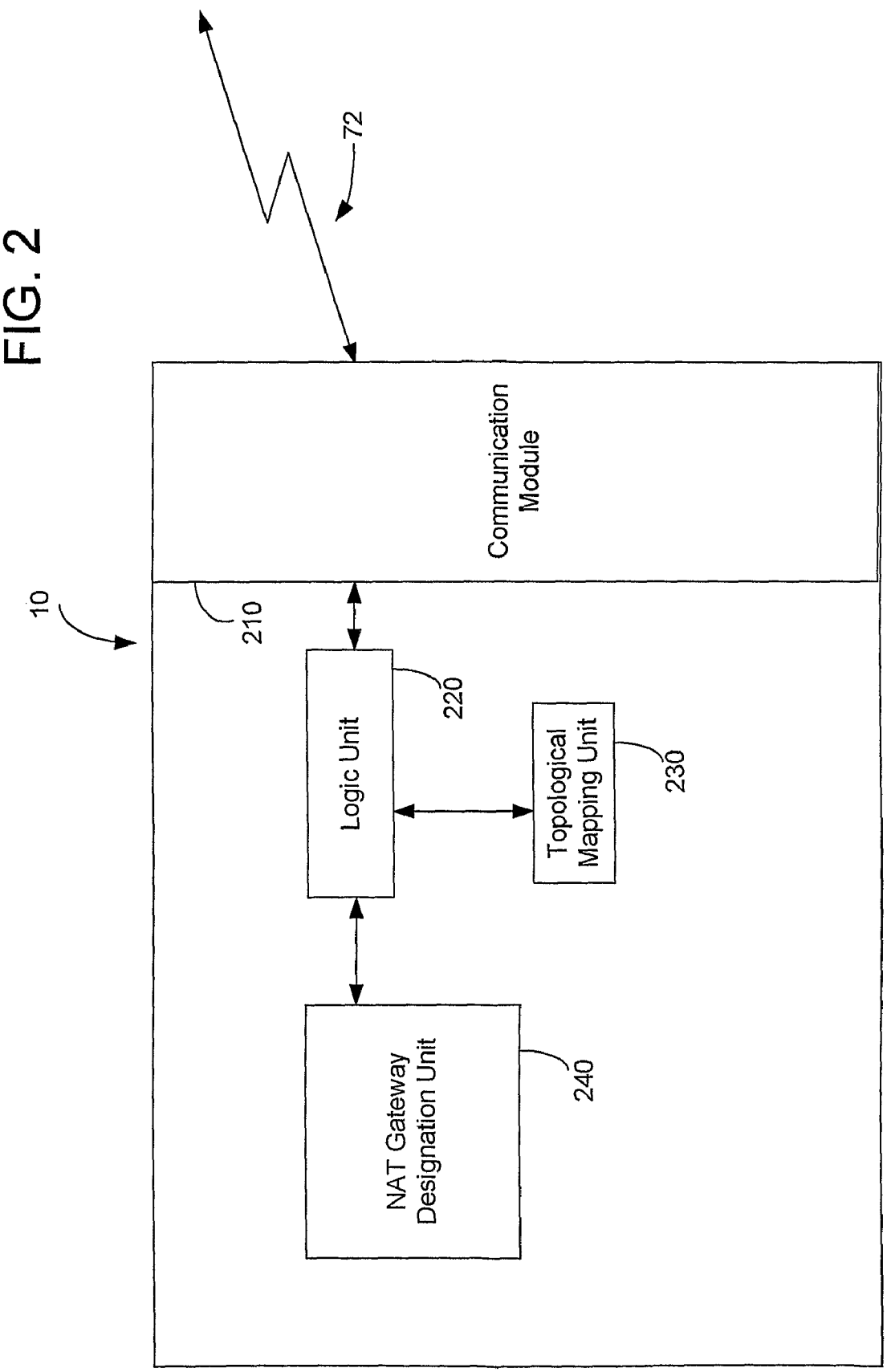

FIG. 3

Some host on the network

NAT Detector

NAT Gateway

Part of an existing TCP session

Packet pretending to be part of the TCP session, with TTL that will be 0 when it reaches the NAT gateway ICMP Time-exceeded

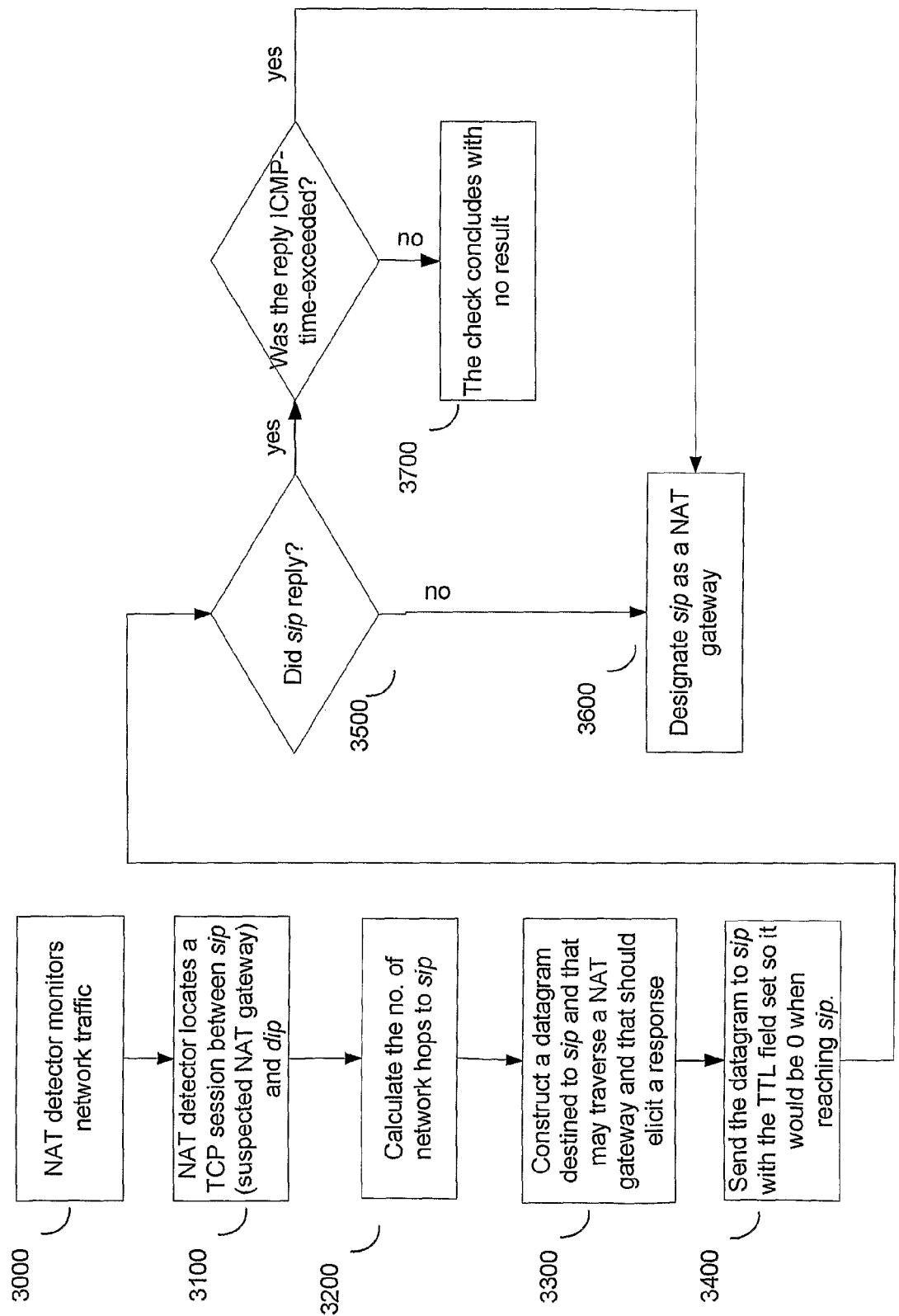

METHOD AND SYSTEM FOR DETECTION OF NAT DEVICES IN A NETWORK

FIELD OF THE INVENTION

The present invention relates generally to the field of network security and management. More specifically, the present invention relates to a method for the detection of unknown or unauthorized routers, gateways and hosts on a network.

BACKGROUND

Network Address Translation (RFC1631 [IP Network Address Translator, Request For Comments 1631, http://www.ietf.org/rfc/rfc1631.txt]) defines a gateway function, by which the gateway bi-directionally translates an IP address range between its two sides. Network Address Translation ("NAT") has many uses, most of them beyond the scope of this document.

NAT may be one-to-one, in which case each IP address on one "side" is translated into one IP address on the other, and vice versa. A specific type of NAT is the Network/Port Address Translation ("NPAT", sometimes also called "PAT" or Masquerading). In this mode, the gateway maps many IP addresses on one "side" (typically "inside") into one IP address (or a few of them) on the other ("outside"). The mapping is done by allocating unique TCP or UDP ports for each connection/conversation, maintaining a state table for all connections going through the gateway to preserve this mapping for returning packets. Such a per-connection mapping entry is usually removed from the tables when it either (a) terminates or (b) times out. In this mode, a high number of hosts (IP addresses) may exist behind one gateway performing NPAT, and their network traffic will be seen on the other side of the translating device (usually "The World") as coming from a single IP address (or a few of them). In a sense, their connections are multiplexed into one IP address While somewhat inaccurate, in the consumer/non-technical realm, the term NAT is widely used to denote NPAT. In the discussion below, we will use the term NAT primarily to indicate NPAT.

The existence of NAT multiplexing on a network has been a challenge to network and security administrators, as it can potentially hide unauthorized hosts, or even entire networks, from network monitors, security systems and administrators. This threat can be made much more severe if the NAT gateway is also a wireless router or access point, since then the hidden hosts can be outside the organization's premises. Detection of such translating devices on a network has hence been an interesting and important problem, and attempts have been made to detect such translating hosts or devices [A Technique for Counting NATted hosts, Steven M. Bellovin, http://www.cs.columbia.edu/~smb/papers/fnat.pdf], [Internet Protocol, Request for Comments 791, http://www.ietf.org/rfc/rfc791.txt. Those proposed techniques used passive analysis of network traffic.

Many devices in today's networks perform Network Address Translation ("NAT"), and particularly NPAT. Among such devices are consumer-type routers and gateways (including wireless gateways), end-user PC's (desktops or laptops) sharing a network connection, and more.

There is a need in the field of network security and management for improved methods of actively detecting NAT gateway devices on a network.

SUMMARY OF THE INVENTION

According to some embodiments of the present invention, there is provided system and method for detection of Network Address Translation ("NAT") Gateways. A NAT detector, including a network communication module, may be connected or otherwise functionally associated with a network to be monitored. The communication module may receive data traffic associated with the network. According to some embodiments, the communication module may receive data mirrored by a network switch.

According to further embodiments of the present invention, the communication module may either include or be functionally associated with detection logic adapted to identify suspected NAT gateway devices. The detection logic may identify a suspected NAT gateway device based on factors such as: (1) data traffic, (2) number of different concurrent sessions, (3) heavy use of high numbered TCP and/or UDP ports, (4) behavior characteristic of several different operating systems originating from the same device, and/or any other method known now or to be devised in the future. The communication module may receive data packets associated with a communication session in which the suspected NAT gateway device is engaged.

According to some alternative embodiments of the present invention, the NAT detector may be configured to probe for suspected NAT gateway devices by the detector's administrator, e.g. by manually entering IP address ranges. According to some alternative embodiments of the present invention, the NAT detector may perform its detection upon all hosts in the network.

According to some embodiments of the present invention, the NAT detector's communication module may be adapted to transmit an interrogation packet to a suspected NAT gateway. An interrogation packet may be a data packet having a Time-To-Live ("TTL" [Internet Protocol, Request for Comments 791, http://www.ietf.org/rfc/rfc791.txt]) correlated with a topological distance between the detector and the suspected NAT gateway. According to some embodiments of the present invention, the interrogation packet sent to the suspected NAT gateway may be adapted to emulate a packet of a communication session in which the suspected NAT gateway is engaged. The TTL field of the packet sent to the suspected gateway may be calculated based on the number of hops between the detector and the suspected gateway, such that the TTL field equals zero upon the packet arriving at the suspected NAT gateway. The interrogation packet having a Time-To-Live ("TTL" [Internet Protocol, Request for Comments 791, http://www.ietf.org/rfc/rfc791.txt]) correlated with a topological distance between the detector and the suspected NAT gateway may be constructed such that there is no effect on the end-points of the session with which it is being associated. The interrogation packet may be effectively transparent or stealthed with respect to the given session into which it is being injected.

According to some embodiments of the present invention, the NAT detector may send a set of packets to the suspected NAT gateway, such that the Time To Live (TTL) field of consecutive packets sent may be modified on each successive sent packet until the TTL value of the sent packet reaches a predefined limit or until an Internet Control Message Protocol ("ICMP" [Internet Control Message Protocol, Request for Comments 792, http://www.ietf.org/rfc/rfc792.txt]) "Time Exceeded" packet is received from the suspected NAT gateway.

According to some embodiments of the present invention, the communication module may be adapted to receive response packets from the suspected NAT gateway. According to further embodiments of the present invention, the detector may include a NAT designation unit adapted to identify a NAT gateway device upon receiving an ICMP "Time Exceeded" packet from a suspected NAT gateway.

According to some further embodiments of the present invention, the communication module may send an interrogation packet which may be an IP client response solicitation packet to the suspected NAT gateway. In the event the suspected NAT gateway does not respond to an IP client response solicitation packet, the NAT designation unit, according to this embodiment, may designate the non-responding suspected NAT gateway as an actual NAT gateway.

According to some embodiments of the present invention, an IP client response solicitation packet may be any packet that elicits a response from its receiver, such as TCP Keep-alive [Requirements for Internet Hosts, Request for Comments 1122, http://www.ietf.org/rfc/rfc1122.txt], higher-level protocol (e.g. HTTP/1.1 [Hypertext Transfer Protocol—HTTP/1.1, Request for Comments 2616, http://www.ietf.org/rfc/rfc2616.txt]) keep-alive, or any other packet that requires a response according to the higher-level protocol used in the session. Such IP client response solicitation packet may be constructed such that there is no effect on the end-points of the session with which it is being associated. The interrogation packet may be effectively transparent or stealthed with respect to the given session into which it is being injected.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 2 is a block diagram showing the functional blocks of a NAT detector device, according to some embodiments of the present invention;

FIG. 3 is a symbolic data flow diagram showing a possible example of packet exchange between a NAT detector device, and a NAT gateway according to some embodiments of the present invention;

FIG. 5 is a flowchart listing the steps of a second exemplary method by which a NAT detector device may detect a NAT gateway, according to some embodiments of the present invention.

Figure 1A:
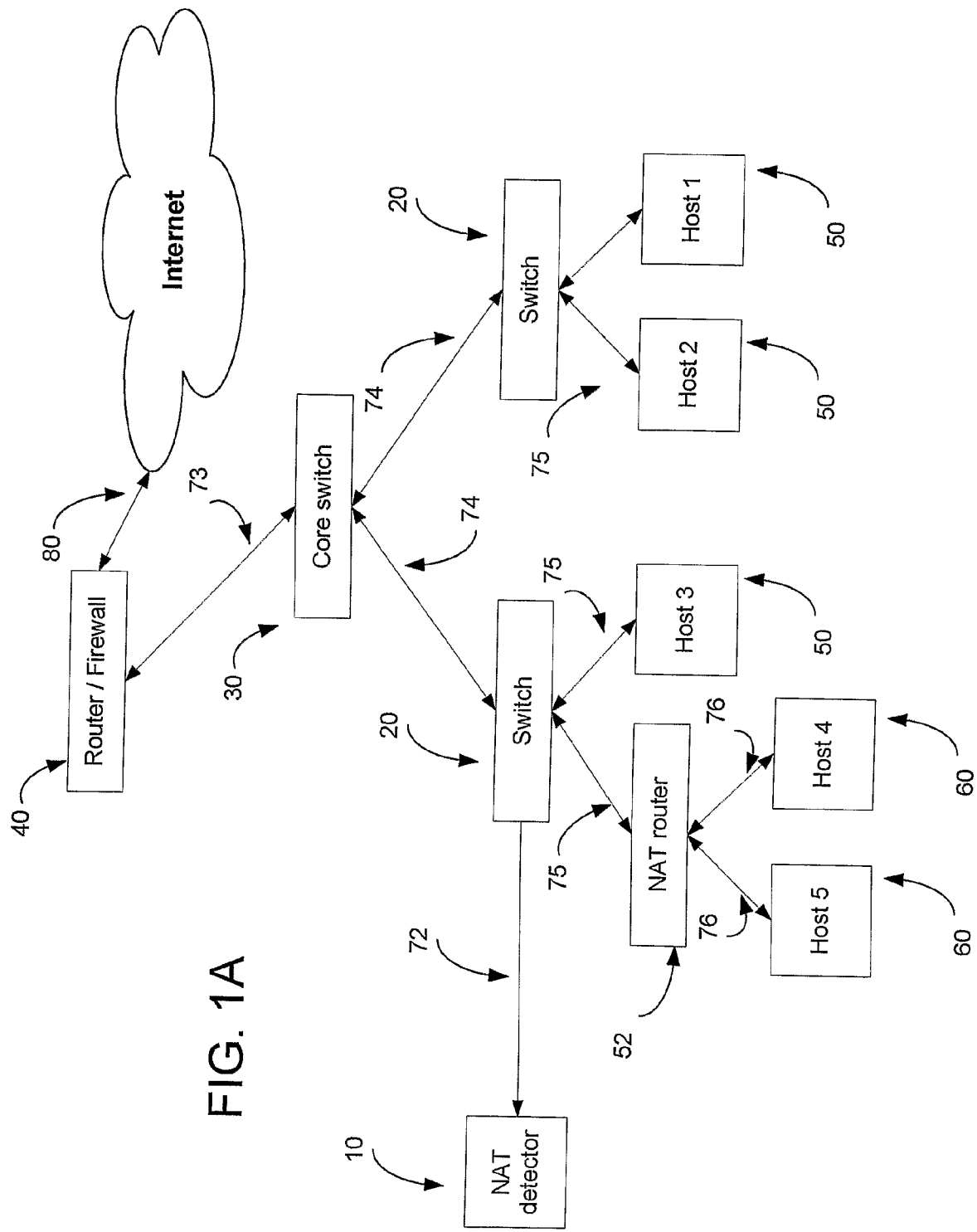
FIG. 1A is a block diagram showing a simplified network topology as a possible configuration for connecting a NAT detector device, according to some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. Such apparatus may be specially constructed for the desired purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

According to some embodiments of the present invention, there are provided systems and methods for detection of Network Address Translation ("NAT") Gateways. A NAT detector, including a network communication module, may be connected or otherwise functionally associated with a network being monitored. The communication module may receive data traffic associated with the network. According to some embodiments, the communication module may receive data mirrored by a network switch.

According to further embodiments of the present invention, the communication module may either include or be functionally associated with detection logic adapted to identify suspected NAT gateway devices. The detection logic may identify a suspected NAT gateway device based on factors such as: (1) data traffic, (2) a number of different concurrent sessions, (3) heavy use of high numbered TCP and/or UDP ports, (4) behavior characteristic of several different operating systems originating from the same device, and/or any other method known now or to be devised in the future. The communication module may receive data packets associated with a communication session in which the suspected NAT gateway device is engaged.

According to some alternative embodiments of the present invention, the NAT detector may be configured to scan for suspected NAT gateway devices by the detector's administrator, e.g. by manually entering IP address ranges. According to some alternative embodiments of the present invention, the NAT detector may perform its detection upon all hosts in the network.

According to some embodiments of the present invention, the NAT detector's communication module may be adapted to transmit an interrogation packet to a suspected NAT gateway. An interrogation packet may be a data packet having a Time-To-Live ("TTL") correlated with a topological distance between the detector and the suspected NAT gateway. According to some embodiments of the present invention, the interrogation packet sent to the suspected NAT gateway may be adapted to emulate a packet of a communication session in which the suspected NAT gateway is engaged. The TTL field of the packet sent to the suspected gateway may be calculated based on the number of hops between the detector and the suspected gateway, such that the TTL field equals zero upon the packet arriving at the suspected NAT gateway.

According to some embodiments of the present invention, the NAT detector may send a set of packets to the suspected NAT gateway, such that the Time To Live (TTL) field of consecutive packets sent may be modified on each successive sent packet until the TTL value of the sent packet reaches a predefined limit or until an Internet Control Message Protocol ("ICMP") "Time Exceeded" packet is received from the suspected NAT gateway.

According to some embodiments of the present invention, the communication module may be adapted to receive response packets from the suspected NAT gateway. According to further embodiments of the present invention, the detector may include a NAT designation unit adapted to identify a NAT gateway device upon receiving an ICMP "Time Exceeded" packet from a suspected NAT gateway.

According to some further embodiments of the present invention, the communication module may send an interrogation packet which may be an IP client response solicitation packet to the suspected NAT gateway. In the event the suspected NAT gateway does not respond to an IP client response solicitation packet, the NAT designation unit, according to this embodiment, may designate the non-responding suspected NAT gateway as an actual NAT gateway.

According to some embodiments of the present invention, an IP client response solicitation packet may be any packet that elicits a response from its receiver, such as TCP Keep-alive, higher-level protocol (e.g. HTTP/1.1) keep-alive, or any other packet that require a response according to the higher-level protocol used in the session.

Reference is now made to FIG. 1A, which is a block diagram showing a simplified network topology of a possible configuration for connecting a NAT detector device according to some embodiments of the present invention. According to some embodiments of the present invention, the network may comprise a primary router/firewall 40 which is the gateway to the internet over the link 80. The router/firewall 40 may be connected to a core switch 30 over the link 73. The core switch may be connected to distribution switches 20 over the links 74. Regular hosts 50 may be connected to the distribution switches 20 over the links 75. The NAT detector 10 may be connected to a distribution switch 20, via a port configured to mirror all traffic, so that it can monitor network traffic through the switch over the monitoring link 72. A rogue NAT gateway 52 may be connected to a distribution switch 20, such that it and the hosts connected to it 60 may appear as a single host to the rest of the network.

Figure 1B:
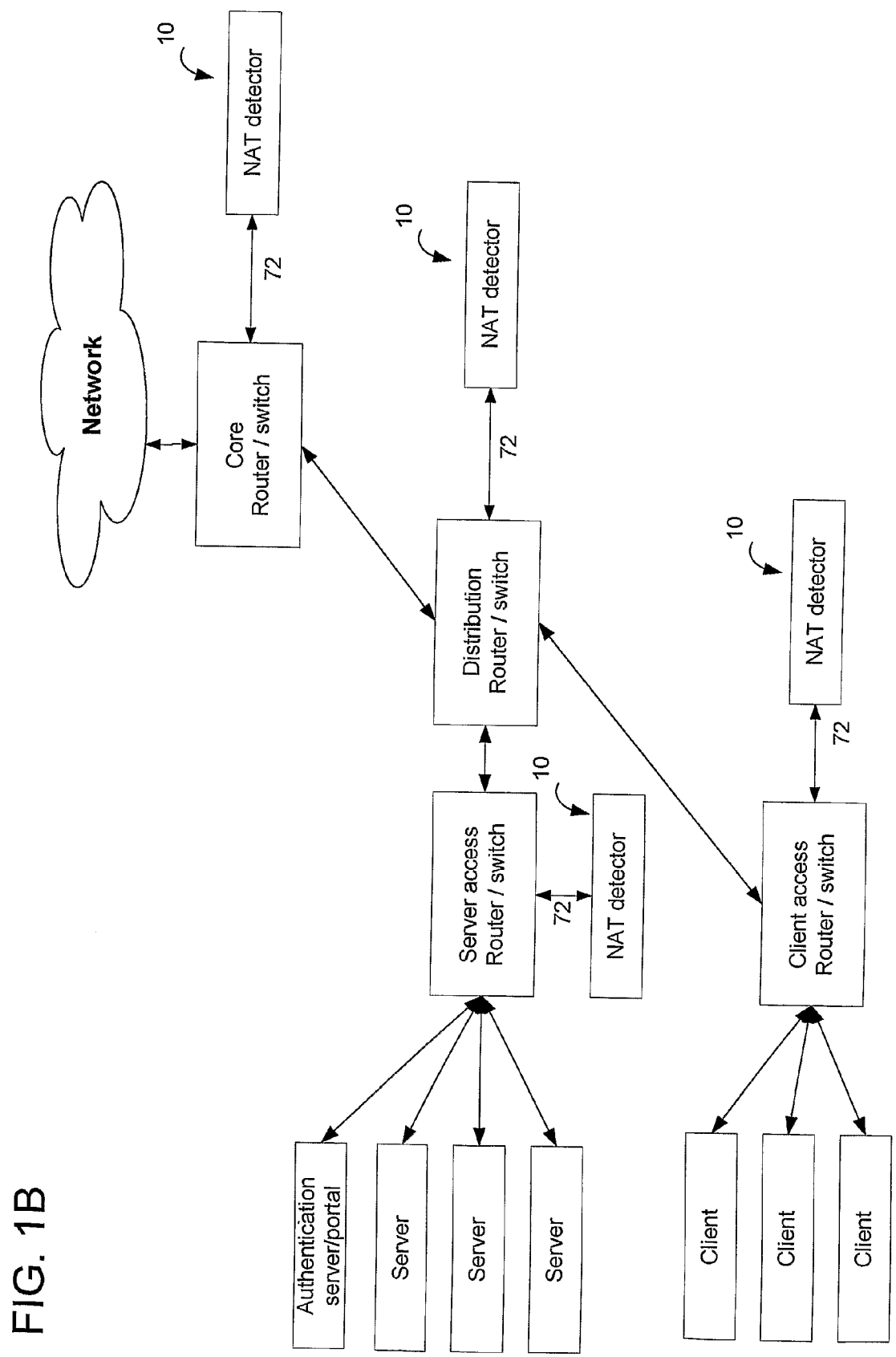
FIG. 1B is a block diagram showing several possible configurations for connecting a NAT detector device, according to some embodiments of the present invention.

FIG. 1B shows show several possible configurations for connecting a NAT detector to a network according to some embodiments of the present invention. It should be clear to one of ordinary skill in the art of computer networking that any one of multiple interconnection schemes may be implemented as part of the present invention.

Reference is now made to FIG. 2, which is a block diagram illustration of one possible configuration of a NAT detector device, in accordance with some embodiments of the present invention. According to some embodiments of the present invention, a NAT detector device 10 may include a communication module 210. The communication module 210 may be adapted to receive data traffic associated with the network, receive data packets associated with communication session in which a suspected NAT gateway device is engaged, and transmit interrogation packets to a suspected NAT gateway.

According to some embodiments of the present invention, the NAT detector device 10 may also include a logic unit 220. The logic unit 220 may be adapted to identify suspected NAT gateway devices.

According to some embodiments of the present invention, a NAT detector device 10 may also include a topological mapping unit 230. The topological mapping unit 230 may be adapted to calculate the topological distance between the detector and a suspected NAT gateway.

According to some embodiments of the present invention, the NAT detector device 10 may also include a NAT gateway designation unit 240. The NAT gateway designation unit 240 may be adapted to identify a NAT gateway device based on its response to an interrogation packet.

Figure 4:
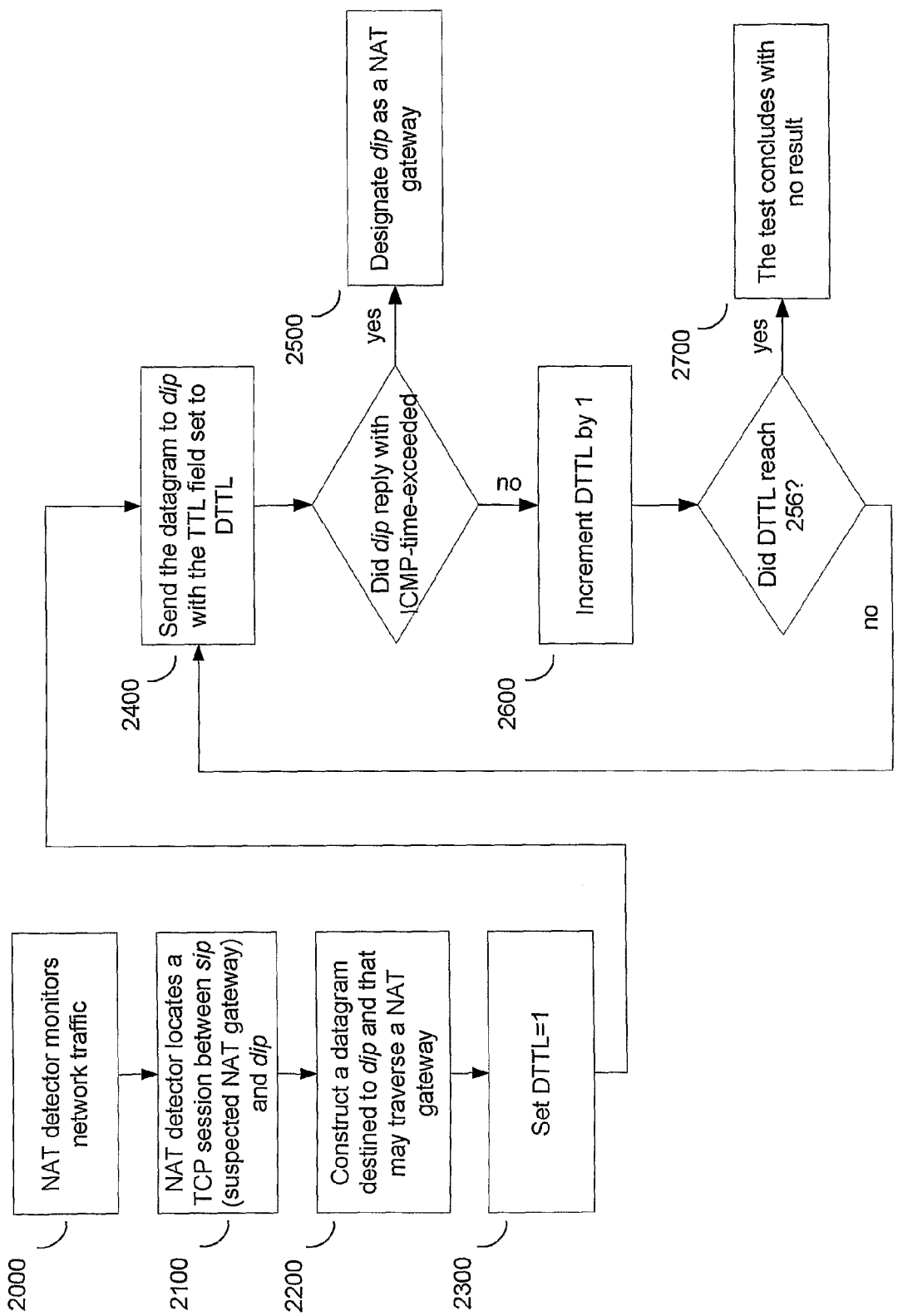
FIG. 4 is a flowchart listing the steps of an exemplary method by which a NAT detector device may detect a NAT gateway, according to some embodiments of the present invention.

For illustration purpose, a description of one non-limiting example of a NAT detection technique which may be used in accordance with some embodiments of the present invention is provided herein. The following example is described as a packet flow diagram in FIG. 3 and a flowchart in FIG. 4. According to some embodiments of the present invention, a NAT detector may monitor network traffic (step 2000). According to some embodiments of the present invention, should a NAT detector device suspect an IP client sip to be a NAT gateway, it may wait for it to establish a connection, (e.g. a TCP session) with some other host dip on the network (step 2100). According to some embodiments of the present invention, after locating such a session, the NAT detector may construct a datagram that may appear to an intermediate gateway as part of the existing TCP session (step 2200). According to some embodiments of the present invention, the NAT detector may set the aforementioned datagram's TTL field to 1 (step 2300) and send it to the suspected NAT gateway (step 2400). According to some embodiments of the present invention, the NAT detector may then wait for replies from the suspected NAT gateway. According to some embodiments of the present invention, should the suspected NAT gateway reply with an ICMP "Time Exceeded" packet, it would be designated by the NAT detector as a NAT gateway (step 2500). According to some embodiments of the present invention, if there is no reply from the suspected NAT gateway, the NAT detector may increase the TTL by 1 (step 2600), and send another datagram (step 2400). According to some embodiments of the present invention, if the NAT detector does not receive an ICMP "Time Exceeded" from the suspected NAT gateway when the TTL field has reached 255, the test concludes with no result (step 2700).

For illustration purpose, a description of another non-limiting example of a NAT detection technique as described in FIG. 5 and which may be used in accordance with some embodiments of the present invention is provided herein. According to some embodiments of the present invention, the NAT detector may monitor network traffic (step 3000). According to some embodiments of the present invention, should the NAT detector device suspect an IP client sip to be a NAT gateway, it may wait for it to establish a TCP session with some other host dip on the network (step 3100). According to some embodiments of the present invention, the NAT detector may calculate its distance (number of "hops") from sip (step 3200). According to some embodiments of the present invention, after locating such a session, the NAT detector may construct a datagram that may appear to an intermediate gateway as part of the existing TCP session and that should elicit a response from the destination (step 3300). According to some embodiments of the present invention, the NAT detector may send the aforementioned packet to the suspected NAT gateway, setting the TTL field to the number of hops, such that it would become zero when reaching the suspected NAT gateway (step 3400). According to some embodiments of the present invention, the NAT detector may then wait for replies from sip. According to some embodiments of the present invention, should the NAT detector receive no reply from sip (step 3500), it would designate it as a NAT gateway (step 3600). According to some embodiments of the present invention, should sip reply with an ICMP Time Exceeded packet, it would be designated by the NAT detector as a NAT gateway (step 3600).

Each of the references cited below is hereby incorporated by reference into the present disclosure.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A Network Address Translation ("NAT") Gateway detector comprising:
   a network communication module to generate and transmit over a wired network one or more interrogation packets to an external side of a suspected NAT gateway, wherein the one or more interrogation packets are generated to emulate a packet of a current session in which the suspected NAT gateway is engaged and transmitted with a Time to Live (TTL) field selected to expire upon arrival of the packet at the suspected gateway, and wherein said communication module monitors responses sent by the suspected NAT gateway over the wired network.

2. The detector according to claim 1, wherein said communication module monitors one or more data packets associated with a communication session in which the suspected NAT gateway engages.

3. The detector according to claim 1, wherein the one or more interrogation packets are constructed such that there is no effect on the end-points of the session with which the packets are associated.

4. The detector according to claim 1, wherein the one or more interrogation packets have a Time-To-Live ("TTL") field correlated with a topological distance between said detector and the suspected NAT gateway.

5. The detector according to claim 1, further comprising a NAT designation unit to designate the suspected NAT gateway as an actual NAT gateway upon said detector receiving an Internet Control Messaging Protocol ("ICMP") Time Exceeded packet from the suspected NAT gateway in response to an interrogation packet.

6. The detector according to claim 1, wherein the Time To Live (TTL) field of the one or more interrogation packets are increased as each successive packet is sent until the TTL field value reaches a predefined limit or an Internet Control Messaging Protocol ("ICMP") Time Exceeded packet is received from the suspected NAT gateway.

7. The detector according to claim 1, further comprising a communication module to receive responses from the suspected NAT gateway.

8. The detector according to claim 1, further comprising a NAT designation unit to designate the suspected NAT gateway as an actual NAT gateway.

9. The detector according to claim 8, wherein said NAT designation unit designates the suspected NAT gateway as an actual NAT gateway upon detecting an ICMP Time Exceeded packet from said suspected NAT gateway in response to an interrogation packet.

10. The detector according to claim 8, wherein said NAT designation unit designates a given suspected NAT gateway as an actual NAT gateway upon said detector not receiving a response to an IP client response solicitation packet sent to the given suspected NAT gateway.

11. A method for Network Address Translation ("NAT") Gateway detection comprising:
    generating and transmitting over a wired network one or more interrogation packets to an external side of a suspected NAT gateway;
    wherein one or more of said interrogation packets are generated to emulate a packet of a current session in which the suspected NAT gateway is engaged and are transmitted with a Time to Live (TTL) field selected to expire upon arrival of the packet at the suspected gateway; and
    monitoring responses sent by the suspected NAT gateway over the wired network.

12. The method according to claim 11, further comprising monitoring one or more data packets associated with a communication session in which the suspected NAT gateway engages.

13. The method according to claim 11, wherein the one or more interrogation packet are constructed such that there is no effect on the end-points of the session with which the packets are associated.

14. The method according to claim 11, wherein the one or more interrogation packets have a Time-To-Live ("TTL") field correlated with a topological distance between said detector and the suspected NAT gateway.

15. The method according to claim 11, further comprising designating the suspected NAT gateway as an actual NAT gateway upon receiving an Internet Control Messaging Protocol ("ICMP") Time Exceeded packet from the suspected NAT gateway in response to an interrogation packet sent to the suspected NAT gateway.

16. The method according to claim 11, wherein the Time To Live (TTL) field of the one or more interrogation packets are incremented as each successive packet is sent until the TTL field value reaches a predefined limit or an Internet Control Messaging Protocol ("ICMP") Time Exceeded packet is received from the suspected NAT gateway.

17. The method according to claim 16, further comprising receiving a response from the suspected NAT gateway.

18. The method according to claim 17, further comprising designating the suspected NAT gateway as an actual NAT gateway upon receiving an ICMP Time Exceeded packet from the suspected NAT gateway in response to an interrogation packet sent to the suspected NAT gateway.

19. The method according to claim 11, further comprising designating the suspected NAT gateway as an actual NAT gateway upon not receiving a response to an IP client response solicitation packet sent to the suspected NAT gateway.

* * * * *